Figure 1:
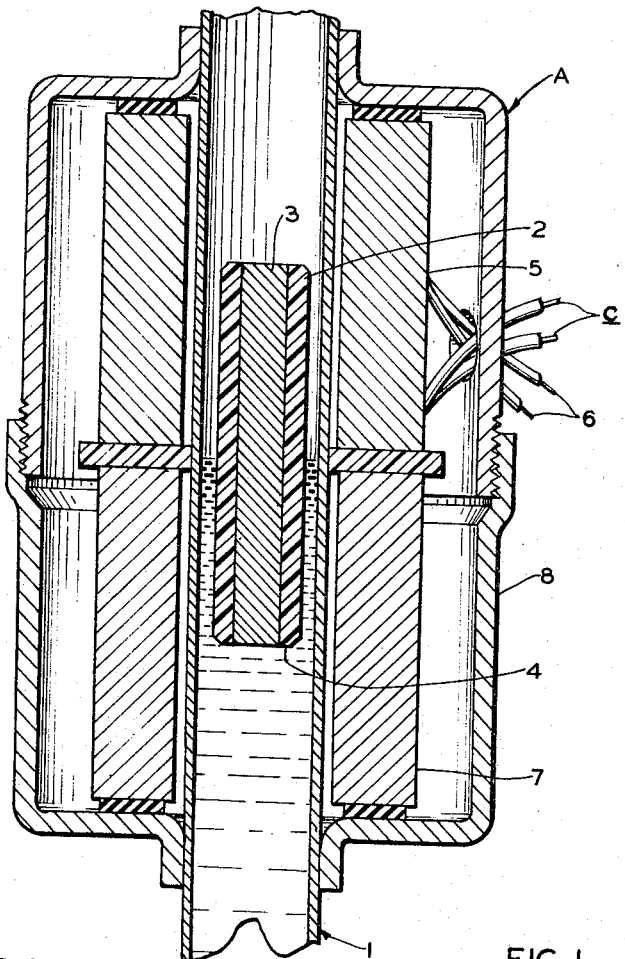

July 18, 1967 G. E. BARKER 3,331,245
SENSORY TRANSDUCERS

Filed Nov. 2, 1964 2 Sheets-Sheet 1

INVENTOR.
GEORGE E. BARKER
BY *Robert J. Schaap*
ATTORNEY

United States Patent Office 3,331,245
Patented July 18, 1967

3,331,245
SENSORY TRANSDUCERS
George E. Barker, St. Louis, Mo., assignor to Monsanto Company, St. Louis, Mo., a corporation of Delaware
Filed Nov. 2, 1964, Ser. No. 408,268
10 Claims. (Cl. 73—313)

This invention relates in general to certain new and useful improvements in transducers and more particularly, to sensory transducers which are capable of indicating changes in a measured variable by generation of electrical signals.

Automatic control instrumentation has experienced a dynamic growth in the recent years. Today, there is a wide variety of commercially available primary sensing devices which are capable of producing electric signals in proportion to the changes of a sensed physical variable. For example, in the chemical processing industries, it is common to find light sensitive transducers, such as the cadmium sulfide transducer used in the measurement of liquid lever control, flow rate control, and even temperature control. The transducers are designed to sense changes in these measured physical variables and energize a control mechanism which is capable of producing a control signal. The control signal is then transmitted to a final control element, such as a flow control valve, for actuation of the control element in response to the change in the physical variable.

There are many reliable and accurate sensory transducers which are commercially available for plant-scale and pilot plant-scale equipment. However, the principles of operation of these commercially available plant-scale and pilot plant-scale devices do not permit such devices to be scaled-down or reduced in size to laboratory equipment. As a result thereof, the laboratory-scale transducers must be designed with a relatively large size which results in excessive system hold-up in small laboratory installations. The cadmium sulfide photocell sensor, however, is not necessarily subjected to this limitation and, therefore, has found rather widespread use as a sensor in laboratory-scale equipment. Moreover, the sensor has proved to be quite precise and highly reliable. Unfortunately, the cadmium sulfide photocell sensor requires a glass sight tube which necessarily limits its pressure range and moreover, presents some safety hazards in that it is difficult to make explosion-proof.

In conventional control systems, such as liquid level control systems, it is customary to suspend a float or so-called "bob" and measure the position of the "bob" by either electrical or mechanical methods. In laboratory equipment, however, it is difficult and in many cases not possible to design a float which is capable of being suspended in low density liquids and which has sufficient strength to resist high pressures. Inasmuch as the float must be designed with relatively light weight, due to the size of the equipment, surface tension effects and frictional effects are often introduced to the system and cause erratic readings.

It is, therefore, the primary object of the present invention to provide a sensory transducer which is capable of being employed in a wide variety of applications for sensing the changes of a physical variable.

It is another object of the present invention to provide a sensory transducer of the type stated which is capable of being employed in either plant-scale automatic control equipment or laboratory-scale automatic control equipment.

It is an additional object of the present invention to provide a sensory transducer of the type stated which is relatively economical to manufacture and which is yet highly precise and reliable.

It is also an object of the present invention to provide a sensory transducer of the type stated which is not affected by surface tension effects and frictional effects which are often present in laboratory-scale sensory equipment.

It is another salient object of the present invention to provide a sensory transducer of the type stated which is capable of being produced in a small compact unit and which is fairly rigid in its construction.

With the above and other objects in view, my invention resides in the novel features in form, construction, arrangement, and combination of parts presently described and pointed out.

Figure 2:
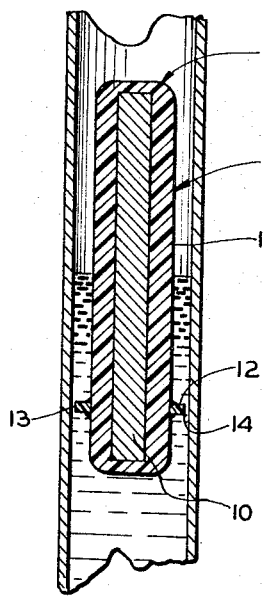
Figure 3:
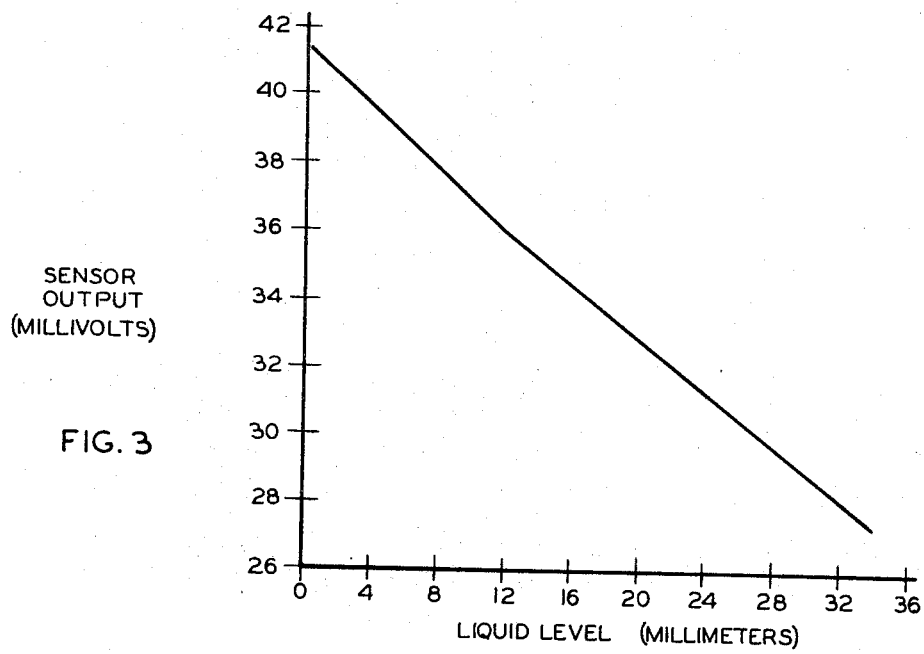
Figure 4:
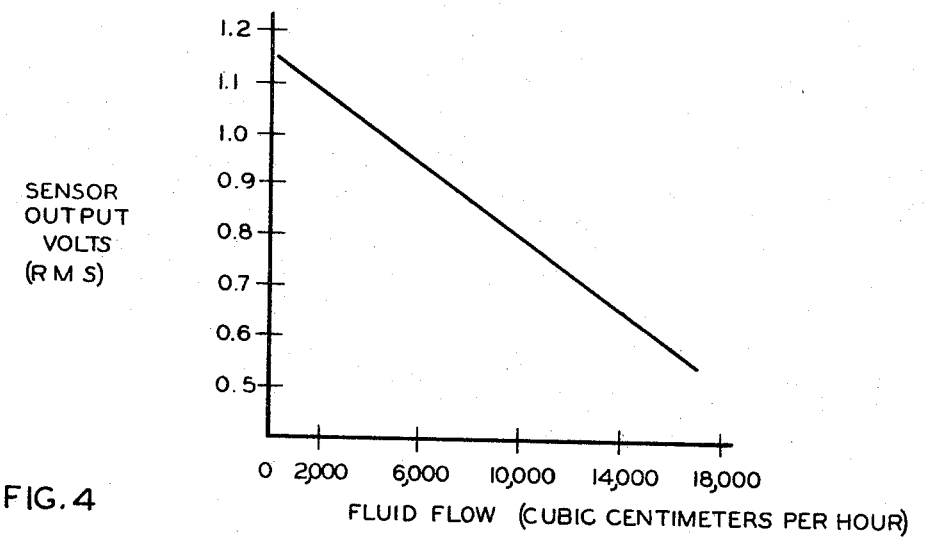

In the accompanying drawing (2 sheets):
FIGURE 1 is a vertical sectional view, partially broken away, of a sensory transducer constructed in accordance with and embodying the present invention;
FIGURE 2 is a vertical sectional view, partially broken away, of a modified form of sensory transducer constructed in accordance with and embodying the present invention;
FIGURE 3 is a graph showing the liquid level control characteristics of the sensory transducer of FIGURE 1, when the latter is employed in a liquid level control application; and
FIGURE 4 is a graph showing the fluid flow control characteristics of the sensory transducer of FIGURE 2 when the latter is used in a fluid flow controller.

Generally speaking, the present invention provides a method and an apparatus for sensing the change in a physical variable by generation of an electrical signal in direct proportion to the change of the physical variable. A sensory element or so-called "float" is disposed within a housing or tube which is in operative communication with the physical variable being sensed. Compensation for the gravitational force exerted upon the sensory element is made by suspending the sensory element in a weak magnetic field generated by an alternating current solenoid. The sensory element is normally suspended in a fluid media which is associated with the physical variable and the force exerted by the magnetic field is sufficient to suspend the sensory element when there is no change in balancing forces. As buoyant forces on the sensory element are increased or decreased by change in the physical variable, the sensory element will tend to shift toward or away from a second solenoid coil which is disposed immediately beneath the first solenoid coil. This shifting of the sensory element which includes a ferromagnetic core varies the mutual inductance between each of the two solenoid coils and induces a voltage in the lower solenoid coil. The voltage induced in the lower solenoid coil is directly proportional to the change in position of the sensory element.

The sensory transducer of the present invention is capable of being employed in a wide variety of applications for measuring the change of a sensed physical variable. The present invention discloses three of such applications; namely, as a liquid level transducer, as a flow rate controller transducer, and as a density measuring transducer.

Referring now in more detail and by reference characters to the drawings, A designates a sensory transducer, substantially as shown in FIGURE 1. The sensory transducer of FIGURE 1 illustrates the application of the transducer as a liquid level transducer, which can be conveniently employed in any suitable liquid level control system, such as the control system described in my co-pending application Ser. No. 323,383, filed Nov. 13, 1963.

The liquid level transducer in FIGURE 1 generally comprises an outer tube or housing 1, which for the purposes of the present invention may be opaque. The housing 1 can be constructed of any suitable material such as a plastic material or a non-magnetic metal, if the need of the sensory device so requires. For the purposes of describing the operation of the present invention, it may be assumed that the tube 1 is connected to a liquid bearing vessel, in the same manner as a sight tube is connected to a vessel for optical determination of the liquid level in the vessel. Inasmuch as the tube 1 is in hydraulic communication with a liquid bearing vessel, the fluid in the tube 1 will reach the same liquid level as the fluid within the vessel. Suspended within the fluid is a sensory element, or so-called "float" or "bob" 2 which consists of a soft iron core 3 entirely surrounded by a Teflon coating 4. In this connection, it should be understood that it is not necessary to construct the sensory element 2 with an iron core inasmuch as any ferromagnetic core would suffice. Moreover, any suitable plastic material which is capable of withstanding corrosion of the fluids with which the liquid level transducer A may be employed, can be substituted for the Teflon coating 4.

Fixedly mounted on and surrounding the tube 1 in a conventional manner is an alternating current solenoid coil 5 having a pair of conductors 6 electrically connected to a source of alternating electrical current (not shown). In connection with the present invention, it has been found that a Variac capable of producing 27 volts (root mean square) 60-cycle, has produced suitable results. When alternating electrical current is applied to the solenoid coil 5, it is capable of generating a weak magnetic field which is just sufficient to overcome the gravitational forces exerted on the sensory element 2 in the absence of a liquid, so that the solenoid coil 5 has the characteristics of a very weak spring. In effect, the solenoid coil 5 serves as a "magnetic spring" which is considerably more reliable than an equivalent helical spring since there is no physical contact with the sensory element 2. This magnetic spring principle thus makes it very practical to produce sizeable deflections of the sensory element 2 with a sensory element density of 3.0 and a liquid density of 0.5.

A second solenoid coil 7 is fixedly mounted on the tube 1 immediately beneath and in juxtaposition to the solenoid coil 5, in the manner as shown in FIGURE 1. By further reference to FIGURE 1, it can be seen that the magnetic core 3 of the sensory element 2 has a length which is substantially equal to the length of the coil 7 and is substantially equal to the length of the coil 5. Moreover, each of the coils 5 and 7 have substantially equal lengths. Consequently, the magnetic core 3 is long enough to partially extend through a portion of each of the coils 5 and 7. Each of the coils 5 and 7 is suitably enclosed within a coil housing or shield 8 which also serves as a magnetic return circuit. The coil 7 is provided with a pair of conductors C which are connected to a suitable direct readout device such as a vacuum tube voltmeter (not shown). The reading on the voltmeter will therefore serve as a direct indication of the change of position of the magnetic core 3.

The sensing of the movement of the sensory element 2 utilizes a principle similar to a linear variable differential transformer. The movement of the magnetic core 3 varies the mutual inductance of the solenoid coils 5 and 7 and thereby provides a precise electrical indication of level change. Inasmuch as an AC voltage is used to power the solenoid coil 5, and hence to suspend the sensory element 2 magnetically, this same alternating current voltage will induce a secondary voltage in the solenoid coil 7. The magnitude of the voltage induced in the coil 7 will, of course, depend upon the distance that the magnetic core 3 or the sensory element 2 is extended within the lower coil 7. The greater the distance in which the magnetic core 3 is extended into the coil 7, the greater the voltage will be induced. Thus, it can be seen that inasmuch as the upper coil 5 is powered from a constant voltage source, this power source provides not only the magnetic spring force, but also the primary excitation of the solenoid coil 7 which acts as a "detector" transformer. Experimentation has shown that the secondary voltage induced into the coil 7 varys linearly with respect to liquid level changes in the tube 1.

The use of alternating electrical current for powering of the solenoid 5 introduces a further advantage to the sensory transducer A by causing the sensory element 2 to vibrate or "dither." The application of alternating electrical current to the coil 5 creates a pulsating magnetic field which causes low amplitude vibrations of the sensory element 2 at twice the line frequency of the current applied to the coil 5. These vibrations of the sensory element 2 are quite advantageous in that they eliminate surface tension effects and frictional effects which would be present if the coil were powered by a direct current source of power. In fact, by use of alternating electrical current and creation of a dither upon the sensory element 2, it has been found that surface tension effects in the tube 1 have been greatly reduced. The sensory transducer A is also advantageously employed in corrosive systems inasmuch as the tube 1 can be made from any non-corrosive plastic or stainless steel, and similarly, the sensory element 2 is enclosed within a Teflon coating which remains substantially free from attack by any corrosive chemical element.

It is possible to provide a modified form of sensory transducer B which is similar to the transducer A, except that the sensory transducer B is employed in fluid flow control systems. The sensory transducer B is substantially identical to the transducer A except that the transducer B is provided with a sensory element 9 which differs somewhat from the sensory element 2 in the transducer A. The sensory element 9 includes a magnetic core 10 which extends for substantially the length of the element 9 and is completely enclosed within a Teflon coating 11. Integrally formed with or rigidly secured to the lower end of the sensory element 9 is an annular disc 12, having peripheral margins 13 which are slightly spaced from the interior wall of the tube 1 providing an annular fluid passageway 14, all as can best be seen in FIGURE 2.

The operation of the sensory transducer B is substantially similar to the operation of the sensory transducer A. The tube 1 of the transducer B is operatively attached to a source of fluid in communication therewith for measuring the rate of fluid flow. As the fluid flows through the tube 1, it will tend to maintain an upward buoyant force upon the disc 12, and hence upon the sensory element 9. However, fluid will flow through the annular channel 14. Naturally, the magnetic force created by the coil 5 for urging the sensory element 9 upwardly would be reduced from that used in the transducer A. Moreover, the magnetic field created by the solenoid coil 5 for urging the sensory element 9 upwardly, and the buoyant force of the fluid is equal to and offset by the gravitational force acting upon the sensory element 9, when the flow rate of fluid is unchanged.

When the flow rate of fluid passing through the tube 1 is increased, it will have an upwardly buoyant effect upon the disc 12 and hence upon the senory element 9. As this occurs, a greater portion of the magnetic core 3 will be urged out of the solenoid coil 7 thereby reducing the power output of the solenoid coil 7. If the flow rate should decrease, the buoyant effect on the sensory element 9 will be reduced and the latter will drop so that the magnetic core 3 extends for a greater portion into the solenoid coil 7. As this occurs, a greater voltage will be induced in the coil 7 and this of course will be read on any direct output such as the vacuum tube voltmeter connected to the coil 7.

From the two illustrated embodiments of the sensory transducer, it can be seen that the sensory transducer is capable of being used in a wide variety of sensory applications. For example, the sensory transducer A can be conveniently employed as a sensor for measuring the change in density. Inasmuch as the sensory element 2 is always subject to an unbalance of forces, the sensory transducer A readily lends itself to relatively efficient operation as a sensor for density measurement. A change of the density in which the sensory element 2 is suspended would naturally create an unbalance of forces upon the sensory element 2 tending to destroy the equilibrium conditions under which the sensory element 2 is suspended. Thus, if the density of the fluid were increased, the sensory element 2 would tend to move upwardly. However, if the density of the fluid passing through the tube 1 were decreased, the sensory element 2 would tend to fall and a greater portion of the magnetic core 3 would extend into the solenoid coil 7. As pointed out above, the amount of extension of the magnetic core 3 into the solenoid coil 7 reflects the voltage output of the coil 7, and hence this voltage output would give an accurate indication of the density of the fluid passing through the tube 1.

The invention is further illustrated by, but not limited to, the following examples.

*Example 1*

The sensory transducer A was used in the application of a liquid level controller. Two solenoid coils from two Hoke series 90 solenoid valves were employed as the solenoid coils 5 and 7. Each of the coils had 4,000 turns of No. 33 wire. The coil housings of each of these valves were used as the magnetic shield and magnetic return circuit 8. The tube 1, which must be non-magnetic, had an outer diameter of ½ inch and a wall thickness of 0.035 inch and was formed of No. 304 stainless steel. The sensory element 2 was made from a steel 10–24 screw having a length of approximately 1.4 inches. The screw was then inserted into a Teflon cylinder which had an outer diameter of 0.325 inch and a length of 1.4 inches. The Teflon served to decrease the average density of the sensory element 2, to protect the steel of the screw, and to prevent metal to metal contact, that is the magnetic core 3 to the interior of the wall 1, which would have led to hysteresis.

The upper coil 5 was connected to a 27-volt (root mean square) 60-cycle Variac for providing alternating electrical current to the coil 5. The cord set from the lower solenoid coil 7 was connected to a rectifier potentiometer readout device. The liquid level change in millimeters was plotted against the sensor output, that is the induced voltage from the solenoid coil 7 and the liquid level characteristic curve of FIGURE 3 was obtained. By reference to FIGURE 3, it can be seen that an almost perfect linear curve was obtained indicating the direct linear relationship between changes in the sensed function and voltage output of the sensing solenoid coil. It was found that the root mean square induced voltage changed from 2.55 volts to 2.10 volts with a level increase of 1.5 inches. Again, the variation was linear. Reproducibility was within the range of ±0.02 inch.

*Example 2*

The following example demonstrates the transducer B in the application of flow control sensory equipment. Again, the tube 1 was made from No. 304 stainless steel having an outer diameter of one-half inch and a wall thickness of 0.035 inch. The two solenoid coils from two Hoke series 90 solenoid valve, each having 4,000 turns of No. 33 wire were employed as the solenoid coils 5 and 7. Also, the coil housings of these valves were used as the magnetic return circuit and shield. The leads 6 from the solenoid coil 5 were connected to a Variac and the output of the solenoid coil 7 was connected to an alternating current vacuum tube voltmeter. The sensory element 2 includes a magnetic core made from No. 430F stainless steel with a 0.25 inch diameter and having a length of 1.21 inches. A Teflon ring having a diametral dimension of 0.415 inch and a thickness of 0.110 inch was disposed about the magnetic core. The Teflon ring provided an annular opening of 0.0075 inch.

The Variac voltage was maintained at 17 volts (root mean square). Flow water was passed through the tube 1 at 20° C. and the output voltage from the coil 7 was measured on the alternating current vacuum tube voltmeter in volts (root mean square). A zero flow passing through the housing in the tube 1 indicated a voltage reading of 1.16. At a maximum voltage of 0.58, the flow rate was 16,400 milliliters per hour. The fluid flow characteristics, that is the flow of fluid in cubic centimeters per hour, was plotted against the sensor output in volts (root mean square) and the graph of FIGURE 4 was obtained. It can be seen that there is a substantially linear relationship between the fluid flow and the voltage output from the coil 7.

*Example 3*

The sensory transducer used in Example 1 was unmodified but was employed as a density gauge. In this case, however, the output of the solenoid coil 7 was connected to a full wave voltage doubler, to provide a direct current voltage readout. A glass liner having a diametral cross-section of ten millimeters was inserted in the tube 1 to reduce friction effects.

Various liquids having different densities were passed through the tube 1 and the voltage output was obtained. Reference to the following chart giving the specific densities in grams per cubic centimeter for four types of fluids shows the voltage readout in direct current.

| | Density, Grams Per Cubic Centimeter | Volts (Direct Current) |
|---|---|---|
| Fluid: | | |
| Air | 0 | 3.60–3.65, average 3.62. |
| Acetone | .792 | 2.65. |
| Benzene | .879 | 2.55. |
| H$_2$O | 1.00 | 2.38–2.45, average 2.40. |

A ratio of the change voltage to the change of density in grams per cubic centimeter found to produce a linear result of 1.22.

It should be understood that changes and modifications in the form, construction, arrangement and combination of parts presently described and pointed out may be made and substituted for those herein shown without departing from the nature and principle of my invention.

Having thus described my invention, what I desire to claim and secure by Letters Patent is:

1. A sensory transducer for measuring the change in a sensed physical variable, said transducer comprising a housing, a sensory element disposed within said housing and being movable responsive to changes in the sensed physical variable, a first alternating magnetic field means coupled with said sensory element for suspending the sensory element in a fluid medium associated with the sensed physical variable, and a second magnetic field means disposed adjacent to and being located in proximate relation to said first magnetic field means, said sensory element being supported by said first magnetic field means so that a portion of the sensory element is always in each of said magnetic field means, said sensory element being formed of a magnetic material for coupling the flux of the first magnetic field means to the second magnetic field means and inducing in the second magnetic field means an output dependent on the position of the sensory element in said first and second magnetic field means, said second magnetic field means providing signals responsive to the position of said sensory element.

2. A sensory transducer for measuring the change in a sensed physical variable, said transducer comprising a housing, a sensory element disposed within said housing and being movable responsive to changes in the sensed physical variable, a first alternating magnetic field means coupled with said sensory element for suspending the sensory element in a fluid medium associated with the sensed physical variable, a second magnetic field means disposed adjacent to and being located in proximate relation to said first magnetic field means, said sensory element being supported by said first magnetic field means so that a portion of the sensory element is always in each of said magnetic field means, said sensory element being formed of a magnetic material for coupling the flux of the first magnetic field means to the second magnetic field means and inducing in the second magnetic field means an output dependent on the position of the sensory element in said first and second magnetic field means, said second magnetic field means providing signals responsive to the position of said sensory element, and means operatively associated with said first magnetic field means for maintaining said sensory element under a constant dither.

3. A sensory transducer for measuring the change in a sensed physical variable, said transducer comprising a housing, a sensory element disposed within said housing and being movable responsive to changes in the sensed physical variable, a first alternating magnetic field means coupled with said sensory element for suspending the sensory element in a fluid medium associated with the sensed physical variable, and a second magnetic field means disposed adjacent to and being located in proximate relation to said first magnetic field means, said sensory element being supported by said first magnetic field means so that a portion of the sensory element is always in each of said magnetic field means, said sensory element being formed of a magnetic material for coupling the flux of the first magnetic field means to the second magnetic field means and inducing in the second magnetic field means an output dependent on the position of the sensory element in said first and second magnetic field means, said second magnetic field means providing signals responsive to the position of said sensory element, each of said magnetic field means and said sensory element having substantially the same length.

4. A sensory transducer for measuring the change in a sensed physical variable, said transducer comprising a housing, a sensory element disposed within said housing and being suspended in a fluid medium associated with the sensed physical variable, said sensory element also being movable responsive to changes in the sensed physical variable, a suspending solenoid coil surrounding said housing and providing an alternating magnetic field sufficient to suspend said sensory element in the fluid medium, means for applying an alternating current to said suspending solenoid coil to maintain said sensory element under a constant dither, and a detecting solenoid coil surrounding said housing and being disposed beneath and located in proximate relation to said suspending solenoid coil, said sensory element being supported by said first magnetic field means so that a portion of the sensory element is always in each of said magnetic field means, said sensory element being formed of a magnetic material for coupling the flux of said suspending solenoid coil to said detecting solenoid coil and inducing in said detecting solenoid coil an output dependent on the position of the sensory element in said suspending and detecting solenoid coils, said sensory element exciting a voltage signal in said detecting solenoid coil responsive to the position of said sensory element therein, the voltage signal produced by said detecting solenoid coil being linearly related to the change in the sensed physical variable.

5. A liquid level transducer for measuring the change in the level of liquid contained within a vessel, said transducer comprising a housing operatively communicating with said vessel, a sensory element disposed within said housing and being suspended in the liquid contained within said housing, said sensory element also being movable responsive to changes in liquid level, a suspending solenoid coil surrounding said housing and providing an alternating magnetic field sufficient to suspend said sensory element in the liquid within the housing, means for applying an alternating current to said suspending solenoid coil to maintain said sensory element under a constant dither, and a detecting solenoid coil surrounding said housing and being disposed beneath and located in proximate relation to said suspending solenoid coil, said sensory element being supported by said alternating magnetic field so that a portion of the sensory element is always in each of said solenoid coils, said sensory element being formed of a magnetic material for coupling the flux of said suspending solenoid coil to said detecting solenoid coil and inducing in said detecting solenoid coil an output dependent on the position of the sensory element in said suspending and detecting solenoid coils, said sensory element exciting a voltage signal in said detecting solenoid coil responsive to the position of said sensory element therein, the voltage signal produced by said detecting solenoid coil being linearly related to the change in the liquid level.

6. A fluid flow transducer for measuring the change in the rate of fluid flow, said transducer comprising a housing operatively connected to the source of the fluid being measured, a sensory element disposed within said housing and being suspended in the fluid contained within said housing, said sensory element also being movable responsive to changes in the rate of fluid flow, a suspending solenoid coil surrounding said housing and providing an alternating magnetic field sufficient to suspend said sensory element in the fluid passing through the housing, means for applying an alternating current to said suspending solenoid coil to maintain said sensory element under a constant dither, and a detecting solenoid coil surrounding said housing and being disposed beneath and located in proximate relation to said suspending solenoid coil, said sensory element being supported by said alternating magnetic field so that a portion of the sensory element is always in each of said solenoid coils, said sensory element being formed of a magnetic material for coupling the flux of said suspending solenoid coil to said detecting solenoid coil and inducing in said detecting solenoid coil an output dependent on the position of the sensory element in said suspending and detecting solenoid coils, said sensory element exciting a voltage signal in said detecting solenoid coil responsive to the position of said sensory element therein, the voltage signal produced by said detecting solenoid coil being linearly related to the change in the rate of fluid flow.

7. A sensory transducer for measuring the change in a sensed physical variable, said transducer comprising a housing, a sensory element disposed within said housing and being suspended in a fluid medium associated with the sensed physical variable, said sensory element also being movable responsive to changes in the sensed physical variable, a suspending solenoid coil surrounding said housing and providing an alternating magnetic field sufficient to suspend said sensory element in the fluid medium, means for applying an alternating current to said suspending solenoid coil to maintain said sensory element under a constant dither, and a detecting solenoid coil surrounding said housing and being disposed beneath and located in proximate relation to said suspending solenoid coil, said sensory element being supported by said alternating magnetic field so that a portion of the sensory element is always in each of said solenoid coils, said sensory element being formed of a magnetic material for coupling the flux of said suspending solenoid coil to said detecting solenoid coil and inducing in said detecting solenoid coil an output dependent on the position of the sensory element in said suspending and detecting solenoid coils, said sensory element exciting a voltage signal in said detecting solenoid coil responsive to the position of said sensory element therein, the voltage signal produced by said detecting solenoid coil being linearly related to the change in the sensed physical variable, said sensory element having substantially the same effective length as each of said solenoid coils.

8. A fluid flow transducer for measuring the change in the rate of fluid flow, said transducer comprising a housing, a tube operatively disposed in said housing and being operatively connected to the source of the fluid being measured, a sensory element disposed within said tube and being suspended in the fluid contained within said tube, said sensory element also being movable responsive to changes in the rate of fluid flow, a suspending solenoid coil surrounding said housing and providing an alternating magnetic field sufficient to suspend said sensory element in the fluid passing through the housing, means for applying an alternating current to said suspending solenoid coil to maintain said sensory element under a constant dither, and a detecting solenoid coil surrounding said tube and being disposed beneath and located in proximate relation to said suspending solenoid coil, said sensory element being supported by said alternating magnetic field so that a portion of the sensory element is always in each of said solenoid coils, said sensory element being formed of a magnetic material for coupling the flux of said suspending solenoid coil to said detecting solenoid coil and inducing in said detecting solenoid coil an output dependent on the position of the sensory element in said suspending and detecting solenoid coils, said sensory element exciting a voltage signal said sensory element exciting a voltage signal in said detecting solenoid coil responsive to the position of said sensory element therein, the voltage signal produced by said detecting solenoid coil being linearly related to the change in the rate of fluid flow.

9. A fluid flow transducer for measuring the change in the rate of fluid flow, said transducer comprising a housing, a tube operatively disposed in said housing and being operatively connected to the source of the fluid being measured, a sensory element disposed within said tube and being suspended in the fluid contained within said tube, said sensory element also being movable responsive to changes in the rate of fluid flow, a suspending solenoid coil surrounding said housing and providing an alternating magnetic field sufficient to suspend said sensory element in the fluid passing through the housing, means for applying an alternating current to said suspending solenoid coil to maintain said sensory element under a constant dither, and a detecting solenoid coil surrounding said tube and being disposed beneath and located in proximate relation to said suspending solenoid coil, said sensory element being supported by said alternating magnetic field so that a portion of the sensory element is always in each of said solenoid coils, said sensory element being formed of a magnetic material for coupling the flux of said suspending solenoid coil to said detecting solenoid coil and inducing in said detecting solenoid coil an output dependent on the position of the sensory element in said suspending and detecting solenoid coils, said sensory element exciting a voltage signal in said detecting coil responsive to the position of said sensory element therein, the voltage signal produced by said detecting solenoid coil being linearly related to the change in the rate of fluid flow.

10. A sensory transducer for measuring the change in a sensed physical variable, said transducer comprising a housing, a tube in said housing, a sensory element disposed within said housing and being movable responsive to changes in the sensed physical variable, a first alternating magnetic field means coupled with said sensory element for suspending the sensory element in a fluid medium in said tube and associated with the sensed physical variable, a second magnetic field means associated with said sensory element and being adapted to provide signals responsive to movement of said sensory element, said sensory element being diametrally smaller than said tube, an annular disc secured to said sensory element and being movable therewith, said disc being diametrally larger than said sensory element and being slightly diametrally smaller than the interior of said tube, and means operatively associated with said first magnetic field means for maintaining said sensory element under a constant dither.

References Cited

UNITED STATES PATENTS

| | | | |
|---|---|---|---|
| 2,791,119 | 5/1957 | Zinn et al. | 73—301 |
| 2,911,828 | 11/1959 | Keating et al. | 73—309 X |
| 2,992,561 | 7/1961 | Burt | 73—453 |
| 3,024,659 | 3/1962 | White | 73—290.1 |
| 3,081,629 | 3/1963 | Clauss et al. | 73—205 |
| 3,126,745 | 3/1964 | Lutke | 73—453 |
| 3,183,496 | 5/1965 | Goldstein | 323—51 X |
| 3,210,746 | 10/1965 | Clapp | 340—199 |

FOREIGN PATENTS 815,488  6/1959  Great Britain.

LOUIS R. PRINCE, *Primary Examiner.*

D. M. YASICH, *Assistant Examiner.*